United States
Carlson

[11] 4,045,133
[45] Aug. 30, 1977

[54] ANALOG OPTICAL BLOCK PROCESSOR
[75] Inventor: Curtis Raymond Carlson, Rocky Hill, N.J.
[73] Assignee: RCA Corporation, New York, N.Y.
[21] Appl. No.: 586,637
[22] Filed: June 13, 1975
[51] Int. Cl.² ............................................. G03B 27/00
[52] U.S. Cl. ..................... 355/1; 240/1 LP; 350/96 BC; 350/96 T; 355/71; 355/125
[58] Field of Search ............ 350/96 BC, 96 T; 355/1, 355/71, 80, 125, 126, 133; 240/1 LP

[56] References Cited
U.S. PATENT DOCUMENTS

| | | | |
|---|---|---|---|
| 3,043,910 | 7/1962 | Hicks | 350/96 BC X |
| 3,141,105 | 7/1964 | Courtney-Pratt | 350/96 BC X |
| 3,221,460 | 12/1965 | Glynn | 350/96 B X |
| 3,398,669 | 8/1968 | Hicks | 355/1 |
| 3,603,665 | 9/1971 | Goldmark et al. | 355/1 X |
| 3,615,433 | 10/1971 | Biernson et al. | 355/80 X |
| 3,630,605 | 12/1971 | Lock | 355/1 |
| 3,641,332 | 2/1972 | Reick et al. | 240/1 LP |
| 3,831,021 | 8/1974 | Muhlogger | 350/96 T X |
| 3,837,727 | 9/1974 | Norton | 350/96 BC |
| 3,904,272 | 9/1975 | Straka | 350/96 BC X |

*Primary Examiner*—Fred L. Braun
*Attorney, Agent, or Firm*—H. Christoffersen; Samuel Cohen; George J. Seligsohn

[57] ABSTRACT

Light quantization of elemental areas of pictorial information by a plurality of contiguous light integrating tunnels, either with or without one of a group of different sampling-function array masks and/or printing-function array masks, is used to modify the original picture information for such purposes as subjectively providing a (1) more pleasing picture, (2) striking special display effects and (3) studying visual perception by the human visual system. Analog processor replaces expensive computer equipment which also required tedious programming, formerly required for producing similar modification of picture information.

3 Claims, 10 Drawing Figures

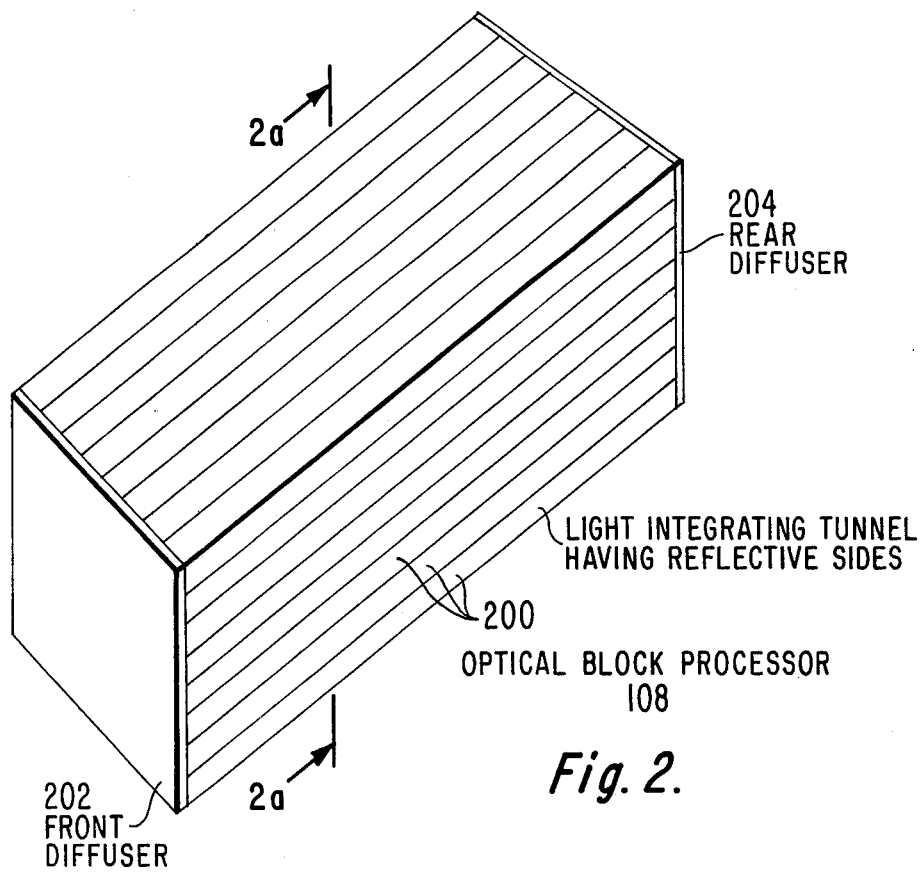
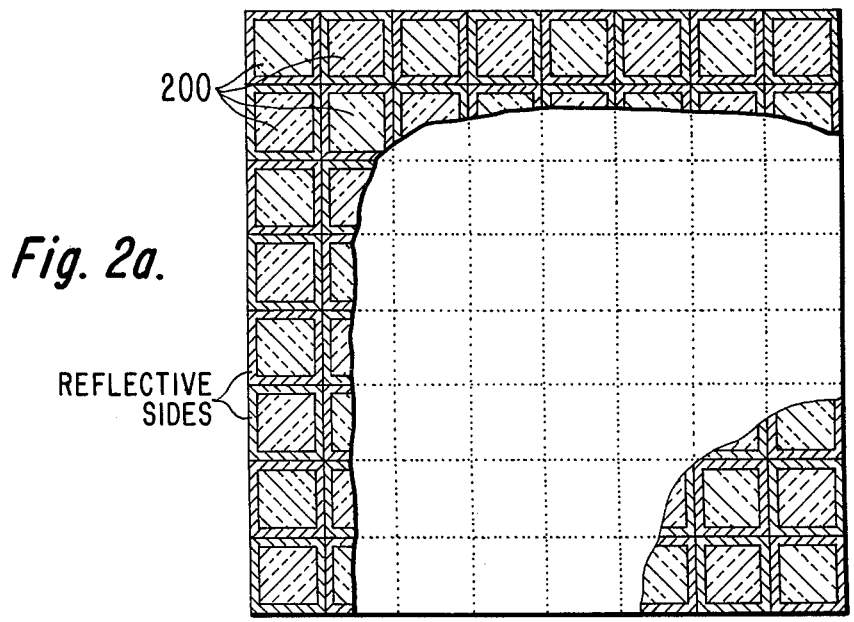

ANALOG OPTICAL BLOCK PROCESSOR

The invention herein disclosed was made in the course of or under a contract or subcontract thereunder with the Department of the Navy.

This invention relates to apparatus for quantizing pictorial information and, more particularly, to an analog optical block processor for doing so.

The display and/or printing of pictorial information, either by necessity or by choice, may involve certain modifications and alterations in the displayed or printed pictorial information with respect to the original pictorial information. For instance, the pictorial information presented on a standard television display is altered and modified with respect to the original pictorial information in the following ways: (1) limited transmission bandwidth means that a certain amount of high frequency spatial details of the original pictorial information is neither transmitted nor displayed; (2) a certain amount of "noise" is displayed which is not in the original pictorial information; and (3) the particular technique used to transmit and display the information results in the display of a raster-scan pattern which is not part of the original pictorial information.

Further, the manner in which a displayed or printed picture is perceived by a viewer depends not only on such objective factors as the spatial distribution and size of the picture elements of the observed picture and the distance of the viewer from the picture, but also on such subjective factors as to how the brain processes the visual images projected on the retinas of viewer's eyes. While little is known about how the brain processes visual information, subjective tests have shown that the same original picture information provides a relatively "more pleasing" or "less pleasing" overall display or print, depending upon how the original picture information is optically processed in producing the display or print. Furthermore, one display or print may appear more pleasing than another when the viewer is a first distance therefrom, while the other display or print may appear more pleasing when the viewer is a second distance therefrom.

Within the constraints of any particular display or printing technique, it is desirable to learn how to modify or alter the original picture information to derive a display or print which, from a subjective point of view, provides the most pleasing overall effect. Further, determining the correlation between a certain type of alteration and modification of pictorial information and its effect in enhancing or detracting from the overall subjective appearance of the displayed or printed picture is helpful in the study of visual perception itself. In addition, the alteration or modification of the original pictorial information to provide striking special subjective effects in displays or prints is useful for such purposes as advertising displays, toys, or as a sophisticated educational device.

It is known in the art to use a suitably programmed computer to control the alteration or modification of pictorial information in any of a vast number of different ways. However, the cost of the computer and the requisite peripheral equipment for producing a modified picture is expensive, and the programming of a computer for this purpose is relatively slow and tedious. The present invention is directed to an analog optical block processor, which not only does away with the need for a computer, but is simple, versatile, and inexpensive.

The basic optical block processor of the present invention comprises an array (usually two-dimensional) of contiguous, relatively long light tunnels, each having light-reflecting sides. Both the front and back surfaces of this array are covered by a light-diffusing medium, such as a plate of ground glass. The light forming a picture image projected on the surface of the front light-diffusing element is thereby broken up into a plurality of elemental areas, each of which corresponds to a separate one of the light tunnels. All the light falling on any single one of the elemental areas is integrated and quantized in traveling the length of the light tunnel corresponding to that area. Therefore, the light emerging from each elemental area of the back diffusing device is uniform over each respective elemental area thereof, but may vary in accordance with picture information from one elemental area to another. Further, an aperture array having respective elements corresponding to each elemental area of the analog optical block processor may be inserted in the light path in front of the front light diffusing medium, behind the back light-diffusing medium, or in both places, as desired, to further alter or modify the display or print. The picture information in the output light may be observed directly by a viewer or, in the alternative, a camera, television pick up or other such apparatus may be employed to further process the pictorial information.

These and other features and advantages of the present invention will become more apparent from the following detailed description, taken together with the accompanying drawing, in which:

FIGS. 2 and 2a illustrate an embodiment of the optical block processor of FIG. 1;

FIG. 4b is a schematic diagram helpful in describing the operation of the modification shown in FIG. 4a.

Figure 1:
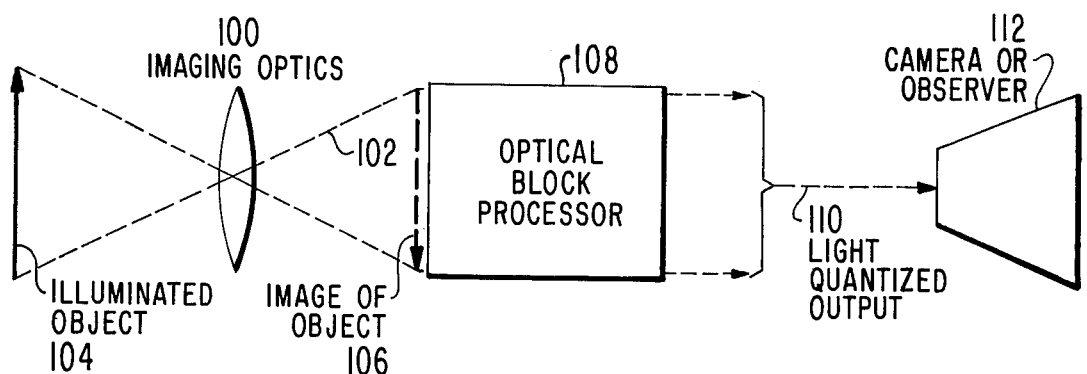
FIG. 1 is a block diagram of a system employing the optical block processor of the present invention.

The basic system embodying the present invention is shown in FIG. 1. Specifically, imaging optics 100 focuses light 102 from illuminated object 104 into image 106 of the object at the front surface of optical block processor 108 (the structure of which is discussed in detail below in connection with FIGS. 2 and 2a). Optical block processor 108 transforms the image 106 of the object 102 into light-quantized output 110 emerging from the back surface of optical processor 108. Light-quantized output 110 may be either viewed directly by an observer or, alternatively, a picture of the information defined thereby may be recorded by the photosensitive element of a camera 112.

Figure 1A:
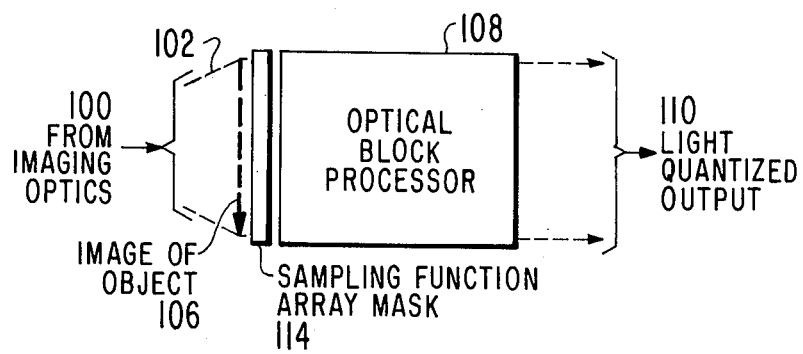
FIG. 1a is a first modification of the system shown in FIG. 1 in which a sampling function array mask is employed in front of the optical block processor of FIG. 1.
Figure 1B:
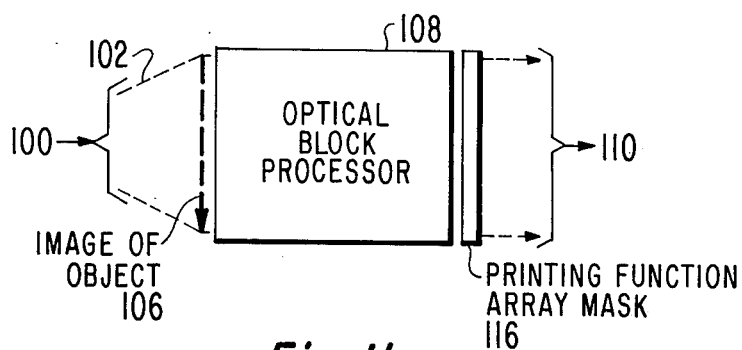
FIG. 1b is a second modification of the system shown in FIG. 1 in which a printing-function array mask is employed behind the optical block processor of FIG. 1.
Figure 1C:
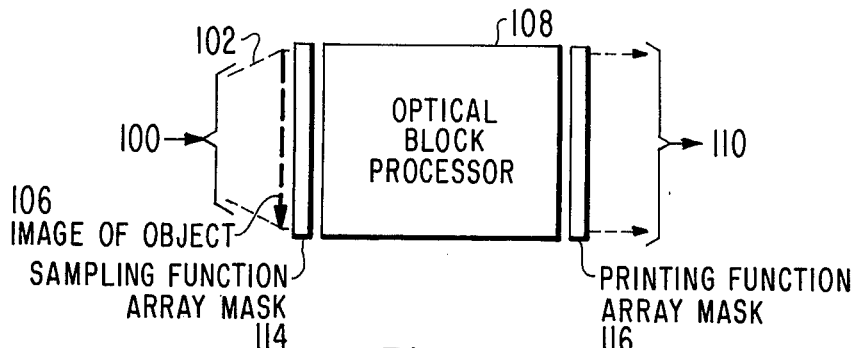
FIG. 1c is a third modification of the system of FIG. 1 in which a sampling-function array mask is employed in front and a printing-functionarray mask is employed behind the optical block processor of FIG. 1.

The basic system shown in FIG. 1 may be modified in any of the manners shown respectively in FIGS. 1a, 1b, or 1c. Specifically, as shown in FIG. 1a, a sampling-function array mask 114 (discussed in detail below in connection with FIGS. 3a and 3b) is inserted immediately in front of the front surface of optical block processor and light 102 from imaging optics 100 forms image 106 of the object at sampling-function array mask 114. In the modification of FIG. 1b, a printing-function array mask 116 is inserted immediately behind the back surface of optical block processor 108, so that light quantized output 110 must pass through printing-function array mask 116 to reach the observer or camera 112. Printing-function array mask 116, as well as sampling-function array mask 114, are described in detail below in connection with FIGS. 3a and 3b. The modification shown in FIG. 1c employs both sampling-function array mask 114 and printing-function array mask 116.

Referring now to FIGS. 2 and 2a, optical block processor 108 comprises a plurality of relatively long contiguous light integrating tunnels 200, each having reflective sides. Each of tunnels 200 may be hollow, or in the alternative, may be composed of a relatively transparent medium. In one example, each of tunnels 200 are composed of a block of methyl methacrylate (Plexiglass) with the sides of each block being covered with aluminum paint. In this example, each Plexiglass block has a length of 4 inches and a cross section of ½ inch × ½ inch. For illustrative purposes, optical block processor 108 is shown as being made up of 64 contiguous blocks, arranged in an 8 × 8 pattern. However, in practice there may be as many blocks as is desirable and the size of each block may be smaller or larger than the ½ inch × ½ inch cross section of the aforesaid example and they may be of arbitrary shape.

In any case, the front surface of the light integrating tunnels 200 comprising optical block processor 108 are covered by front diffuser 202, while the back surface thereof is covered by rear diffuser 204. Both front diffuser 202 and rear diffuser 204 may consist of a plate of ground glass. Any light entering the front end of any given one of light integrating tunnels 200, after being diffused by that portion of front diffuser 202 or which is in cooperative relation therewith, is completely integrated and quantized in traveling through the length of that tunnel and the portion of rear diffuser 204 which is in cooperative relationship with the back surface thereof. Thus, the light emerging from each respective tunnel is of a uniform brightness having a value substantially equal to the average brightness of the light entering that tunnel. Since this average brightness may vary from one light integrating tunnel to another, the uniform quantized light emerging from one tunnel is normally different from the uniform quantized light emerging from another tunnel.

Figure 3A:
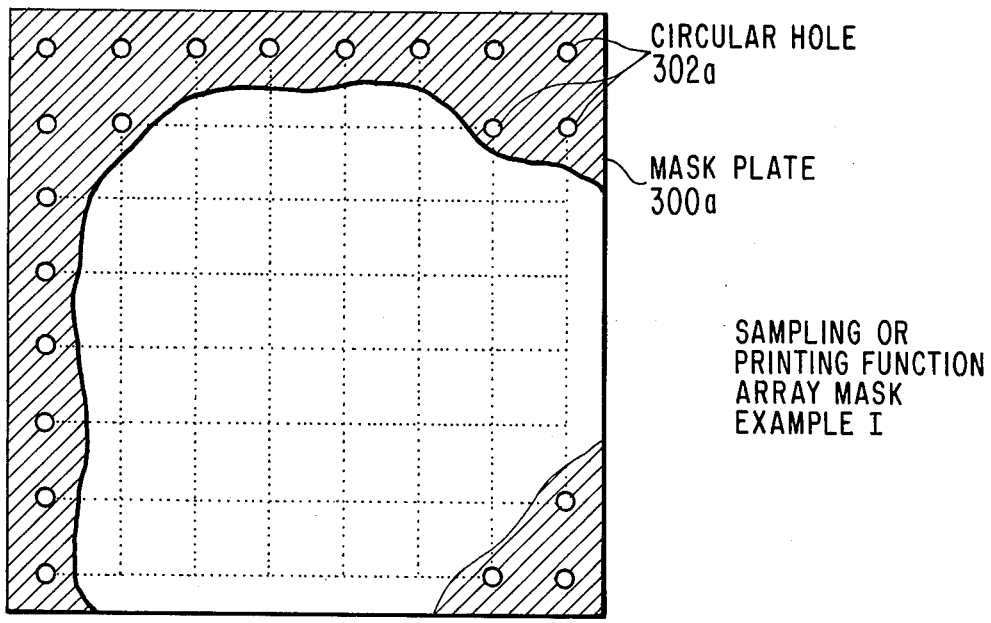
FIG. 3a illustrates a first example of a mask plate which may be employed either as the sampling or printing function array mask.
Figure 3B:
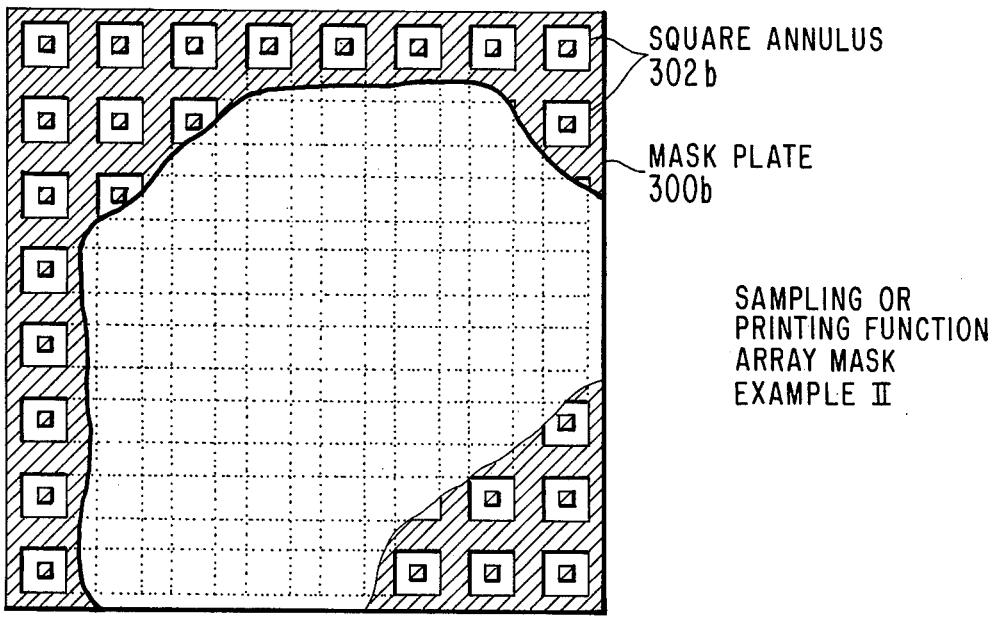
FIG. 3b illustrates a second example of a mask plate which may be employed as a sampling or printing function array mask.

Examples of the sampling-function or printing-function array masks which may be employed in the modifications of 1a, 1b, and/or 1c are shown respectively in FIGS. 3a and 3b. Each of these masks includes a respective individual element thereof corresponding to and in cooperative spaced relationship with each light integrating tunnel 200 of optical block processor 108. Specifically, mask plate 300a of FIG. 3a comprises an array of individual circular holes 302, each of which is individually associated with a corresponding one of light integrating tunnels 200 of optical block processor 108. Each circular hole 202 may have any predetermined diameter from substantially a point to a value not exceeding the cross sectional dimensions of the light integrating tunnel 202 with which it is associated. However, each element of the sampling-function or printing-function array is not limited to a simple circular hole, as shown in FIG. 3a, but may have any desired predetermined shape. For instance, in FIG. 3b, a mask 300b, which may be a photographic transparency which includes as each array element thereof a square anulus 302b, which is a much more complex shape than is the circular hole element 302a of mask plate 300.

The operation of the system shown in FIG. 1 and, particularly, the respective modifications thereof shown in each of FIGS. 1a, 1b, and 1c will now be considered. In the case of FIG. 1, itself and in the case of the modification shown in FIG. 1b, where no sampling-function array mask is employed, the front surface of optical block processor is directly illuminated with the entire image 106 of the object. Therefore, the light quantized output emerging from each light tunnel of optical block processor 108 has a brightness substantially equal to the average brightness of the elemental area of image 106 adjacent to that light tunnel. However, in the case of the modifications shown in FIGS. 1a and 1c, which employ a sample-function array, each light tunnel is illuminated with only a sample of the elemental area of image 106 adjacent thereto. The size and shape of each element of the sampling-function array mask, together with the distribution of light in image 106 itself, determines the relative brightness of light in the light-quantized output from each of the respective light tunnels of optical block processor 108.

The light-quantized output from all the light tunnels of optical block processor 108 are directly observed by an observer or by camera 112 in the case of FIG. 1 and FIG. 1a, or are observed through the elements of a printing-function array mask in the case of FIGS. 1b and 1c. The printing-function array mask, if employed, add its own regular predetermined pattern to the observed light-quantized output.

Thus, by employing a single optical block processor selected from a group of such processors having light-tunnel cross sections of different sizes, either with or without any one of a group of sampling-function masks of different size and shape elements and/or printing-function masks of different size and shape elements, any one of a vast number of different combinations of optically processed light-quantized images of a pictorial object can be easily generated.

Figure 4A:
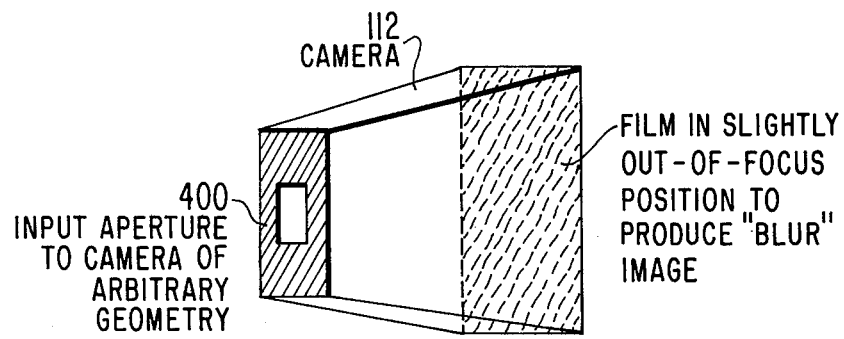
FIG. 4a illustrates a modification of the system shown in FIG. 1 in which an input aperture of arbitrary geometry is employed in front of the camera and the film of the camera is disposed in a slightly out-of-focus position to produce a "blur" image.
Figure 4B:
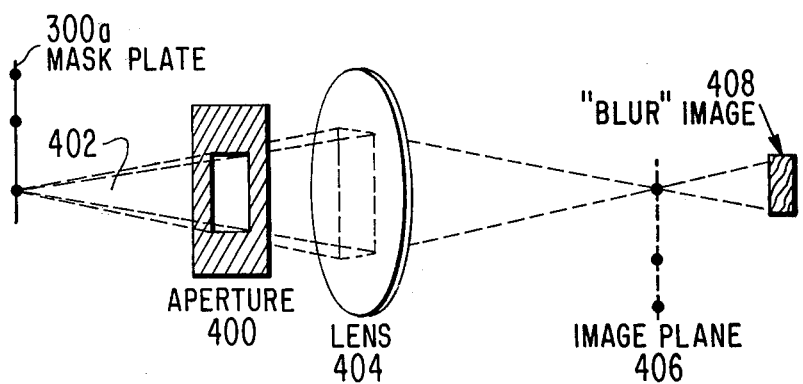

Often it is desirable to employ a printing-function array mask making use of a complex printing-function element compared to the relatively simple circular hole element shown in FIG. 3a. Of course, as shown in FIG. 3b, one can fabricate a printing-function array mask having complex elements. However, a simple arrangement for providing a complex printing-function array is shown in FIGS. 4a and 4b. Specifically, as shown in FIG. 4a, camera 112 of FIG. 1 is modified by limiting the input to the camera with an input aperture 400 of arbitrary geometry and/or other transmission characteristics. In addition, placing the camera film in a slightly out-of-focus position to produce a blur image. As shown in FIG. 4b, this permits a mask plate 300a having simple substantially point-size circular hole elements to be employed as a printing-function array mask which will produce an array of blur images on the film which have the shape of the single input aperture 400. More specifically, as shown in FIG. 4b, each circular hole element of mask plate 300a gives rise to a diverging beam of light 402, which is shaped by aperture 400 and then focused by lens 404 to a corresponding focus point in image plane 406. However, since the film of camera 112 is disposed in a slightly out-of-focus position, the light beam 402 for each respective one of the circular hole elements of mask plate 300a gives rise to a separate blur image, such as blur image 408, on the film. The shape of each blur image will be nearly the same as that of aperture 400. Further, by moving the film to a position somewhat closer to image plane 406, the relative size of each blur image can be made smaller. By moving the film to a position somewhat further from image plane 406, the size of each blur image may be made larger.

For example, if one wanted to produce an output printing function whose individual elements had a relatively complex Gaussian profile transmission characteristic, it would be only necessary to produce a single aperture for the camera with a Gaussian transmission characteristic. This could be accomplished by employing a photographic transparency of the output from a laser as the input aperture to the camera in FIG. 4a.

I claim:

1. An analog optical processor for respectively quantizing the light of each elemental area of a light image manifesting pictorial information which is incident thereon, said analog optical processor comprising:
   a. a plurality of contiguous light integrating tunnels, each of which has substantially the same cross sectional dimensions and a length which is long relative to the cross sectional dimensions thereof and wherein each respective tunnel has reflective sides,
   b. a front diffuser covering the front surface of said plurality of contiguous light integrating tunnels through which said plurality of contiguous light integrating tunnels are illuminated by said incident light image,
   c. a rear diffuser covering the back surface of said plurality of contiguous light integrating tunnels through which light emerging from each of said contiguous light integrating tunnels passes,
   d. a printing-function array mask situated immediately behind said rear diffuser, said printing-function array mask including an individual element of said array corresponding to and in cooperative spaced relationship with each light integrating tunnel, all of said printing function array elements having a predetermined transmission characteristic, each said element comprising a point size hole, and
   e. a camera situated behind said printing-function array mask at a distance therefrom to be illuminated by light passing through the respective elements of said printing-function array mask, and means including a single input aperture situated in front of said camera, said camera including a lens for imaging the light passing through said input aperture in an image plane, and said camera incorporating a recording medium situated in a given plane spaced from said image plane by a given distance to derive an individual blur image of said input aperture on said recording medium for the light from each respective element of said printing-function array mask.

2. The analog processor defined in claim 1, wherein said processor further includes a sampling-function array mask situated immediately in front of said front diffuser, said sampling-function array mask including an individual element of said array corresponding to and in cooperative spaced relationship with each light integrating tunnel, all of said sampling-function array elements having predetermined transmission characteristics.

3. The analog processor defined in claim 2, wherein all of said sampling-function array elements have the same geometrical shape and size.

* * * * *